US011064048B2

(12) United States Patent
Yang

(10) Patent No.: US 11,064,048 B2
(45) Date of Patent: Jul. 13, 2021

(54) METHOD, DEVICE AND SYSTEM FOR INFORMATION INTERACTION IN APPLICATION SERVICE

(71) Applicant: Tencent Technology (Shenzhen) Company Limited, Shenzhen (CN)

(72) Inventor: Weiqing Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 105 days.

(21) Appl. No.: 16/296,062

(22) Filed: Mar. 7, 2019

(65) Prior Publication Data

US 2019/0208037 A1    Jul. 4, 2019

Related U.S. Application Data

(63) Continuation of application No. PCT/CN2017/111873, filed on Nov. 20, 2017.

(30) Foreign Application Priority Data

Nov. 24, 2016   (CN) .......................... 201611050953.4

(51) Int. Cl.
 *G06F 3/048* (2013.01)
 *H04L 29/06* (2006.01)
 (Continued)

(52) U.S. Cl.
 CPC ............ *H04L 67/38* (2013.01); *A63F 13/358* (2014.09); *A63F 13/533* (2014.09);
 (Continued)

(58) Field of Classification Search
 CPC .... A63F 13/358; A63F 13/533; A63F 13/537; A63F 13/71; A63F 13/75; A63F 13/822;
 (Continued)

(56) References Cited

U.S. PATENT DOCUMENTS 7,762,891 B2 * 7/2010 Miyamoto .......... A63F 13/5378
463/31
8,368,645 B2 * 2/2013 Louch ................. G06F 3/04812
345/157

(Continued)

FOREIGN PATENT DOCUMENTS

CN    102968549 A    3/2013
CN    105031922 A    11/2015
(Continued)

OTHER PUBLICATIONS

Tencent Technology, ISRWO, PCT/CN2017/111873, Feb. 9, 2018, 6 pgs.

(Continued)

*Primary Examiner* — Mahelet Shiberou
(74) *Attorney, Agent, or Firm* — Morgan, Lewis & Bockius LLP

(57) ABSTRACT

This application discloses a method, a computing device, and a system for exchanging information in an application service. This application can support a user in performing a first operation on a map object in a service scenario, and displaying a corresponding signal list based on the first operation. Several pieces of prompt information are preset in the signal list. The user may select target prompt information from the signal list. A target client obtains an identifier corresponding to the target prompt information, and generates a first synchronization instruction corresponding to the target prompt information, to instruct each client needing to perform exchange to display the target prompt information on the map object. In addition, the target prompt information is a signal agreed between the clients through communication in advance.

18 Claims, 15 Drawing Sheets

(51) Int. Cl.
> G06F 3/0482 (2013.01)
> G06F 3/0481 (2013.01)
> G06F 3/0484 (2013.01)
> A63F 13/71 (2014.01)
> A63F 13/537 (2014.01)
> A63F 13/533 (2014.01)
> A63F 13/358 (2014.01)
> A63F 13/75 (2014.01)
> H04L 29/08 (2006.01)
> G06F 3/0488 (2013.01)
> A63F 13/822 (2014.01)

(52) U.S. Cl.
CPC ............ *A63F 13/537* (2014.09); *A63F 13/71* (2014.09); *A63F 13/75* (2014.09); *G06F 3/0482* (2013.01); *G06F 3/0484* (2013.01); *G06F 3/04817* (2013.01); *H04L 67/2838* (2013.01); *A63F 13/822* (2014.09); *A63F 2300/306* (2013.01); *A63F 2300/53* (2013.01); *G06F 3/0488* (2013.01); *H04L 67/18* (2013.01)

(58) Field of Classification Search
CPC .. G06F 3/04817; G06F 3/0482; G06F 3/0484; G06F 3/0488; H04L 67/38; H04L 67/2838; H04L 67/18
See application file for complete search history.

(56) References Cited

U.S. PATENT DOCUMENTS

| | | | | |
|---|---|---|---|---|
| 8,448,095 | B1* | 5/2013 | Haussila | G06F 3/04883 715/863 |
| 9,604,132 | B1* | 3/2017 | Wiklem | A63F 13/795 |
| 10,716,996 | B2* | 7/2020 | He | A63F 13/426 |
| 2002/0144273 | A1* | 10/2002 | Reto | H04L 65/4084 725/86 |
| 2005/0192098 | A1* | 9/2005 | Guo | H04L 69/329 463/42 |
| 2006/0040738 | A1* | 2/2006 | Okazaki | A63F 13/5258 463/32 |
| 2010/0184516 | A1* | 7/2010 | Matsumura | A63F 13/12 463/42 |
| 2011/0245942 | A1* | 10/2011 | Yamamoto | A63F 13/5258 700/91 |
| 2014/0066195 | A1* | 3/2014 | Matsui | A63F 13/06 463/30 |
| 2015/0378459 | A1* | 12/2015 | Sawada | G06F 3/0488 345/173 |

FOREIGN PATENT DOCUMENTS

| | | |
|---|---|---|
| CN | 105094345 A | 11/2015 |
| CN | 105159687 A | 12/2015 |

OTHER PUBLICATIONS

Tencent Technology, IPRP, PCT/CN2017/111873, May 28, 2019, 5 pgs.

* cited by examiner

METHOD, DEVICE AND SYSTEM FOR INFORMATION INTERACTION IN APPLICATION SERVICE

CROSS-REFERENCE TO RELATED APPLICATIONS

This application is a continuation application of PCT/CN2017/111873, entitled "METHOD, APPARATUS AND SYSTEM FOR INTERACTION OF INFORMATION IN APPLICATION SERVICE" filed on Nov. 20, 2017, which claims priority to Chinese Patent Application No. 201611050953.4, entitled "METHOD AND SYSTEM FOR EXCHANGING INFORMATION IN APPLICATION SERVICE" and filed with the Chinese Patent Office on Nov. 24, 2016, all of which are incorporated by reference in their entirety.

FIELD OF THE TECHNOLOGY

This application relates to the field of information exchange technologies, and more specifically, to information exchange in an application service.

BACKGROUND OF THE DISCLOSURE

With the development of Internet technologies, an increasing number of applications provide rich services for users. In a service scenario provided by some applications, each user can control one-character model in the service scenario, and a plurality of character models may work in cooperation. For example, in a relatively common gaming application such as a multiplayer online battle arena games (MOBA), a user controls a character model to fight together with other teammates, and a fight object may be a non-player character (NPC) in a scenario or an enemy character model controlled by another player.

In the foregoing service scenario, for applications applied to terminals such as computers that have input functions of keyboards and mice, the user may conveniently exchange information with other users in the scenario by using a keyboard and a mouse, to better complete a given task. However, in the foregoing service scenario, applications applied to terminals such as mobile phones that do not have the input functions of the keyboards and the mice are limited to inconvenient input of virtual keyboards of such terminals. As a result, information communication between users in the service scenario is seriously prohibited, and it is inconvenient for the users to exchange information.

SUMMARY

In view of this, this application provides a method and system for exchanging information in an application service, so as to resolve a problem that users inconveniently exchange information with each other in a service scenario of an existing application applied to an application such as a mobile phone that has no input functions of a keyboard or mouse.

To achieve the foregoing objective, according to a first aspect, this application provides a method for exchanging information in an application service performed by a computing device in connection with a target client, the method comprising:

detecting a first operation on a map object in a service scenario performed by a user;

displaying a signal list corresponding to the first operation, the signal list comprising several pieces of set prompt information, and the map object being a mapped image for a master map of the service scenario;

receiving target prompt information selected by the user from the signal list, the target prompt information being any one of the several pieces of prompt information;

obtaining, based on the target prompt information, an identifier corresponding to the target prompt information;

generating a first synchronization instruction by using at least the identifier corresponding to the target prompt information; and sending the first synchronization instruction to each of a plurality of clients needing to perform exchange, the first synchronization instruction being used for instructing the client to display the target prompt information.

According to a second aspect, this application provides a computing device for exchanging information in an application service in connection with a target client having one or more processors, memory, and a plurality of programs stored in the memory that, when executed by the one or more processors, cause the computing device to perform the aforementioned method for exchanging information in an application service.

According to a third aspect, this application provides a non-transitory computer readable storage medium storing a plurality of instructions in connection with a computing device having one or more processors for exchanging information in an application service in connection with a target client, wherein the plurality of instructions, when executed by the one or more processors, cause the computing device to perform the aforementioned method for exchanging information in an application service.

BRIEF DESCRIPTION OF THE DRAWINGS

To describe the technical solutions in the embodiments of this application or in the existing technology more clearly, the following briefly describes the accompanying drawings required for describing the embodiments or the existing technology. Apparently, the accompanying drawings in the following description show merely embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some embodiments of this application rather than all of the embodiments. All other embodiments obtained by persons skilled in the art based on the embodiments of this application without creative efforts shall fall within the protection scope of this application.

Figure 1:
FIG. 1 is a schematic diagram of a battle field on a MOBA game interface.

A method for exchanging information in an application service provided in this application is mainly applied to a service application having a map object in a service scenario. The map object may be a mapped image of a master map in the service scenario, or is referred to as a radar image. On the master map in the service scenario, there is a plurality of visible objects. All visible objects are presented on the map object. Therefore, a real-time status of the entire master map can be intuitively viewed by using the map object. With reference to FIG. 1, a MOBA game interface is used as an example for description.

As shown in FIG. 1, a battlefield 11 is a master map of a game scene. FIG. 1 shows only a part of the master map. A map object 12 is a mapped image of the battlefield 11. In other words, the map object 12 may be considered as a radar image of the battlefield 11. A character model 13 is a character in the game scene who is controlled by a user.

Figure 2:
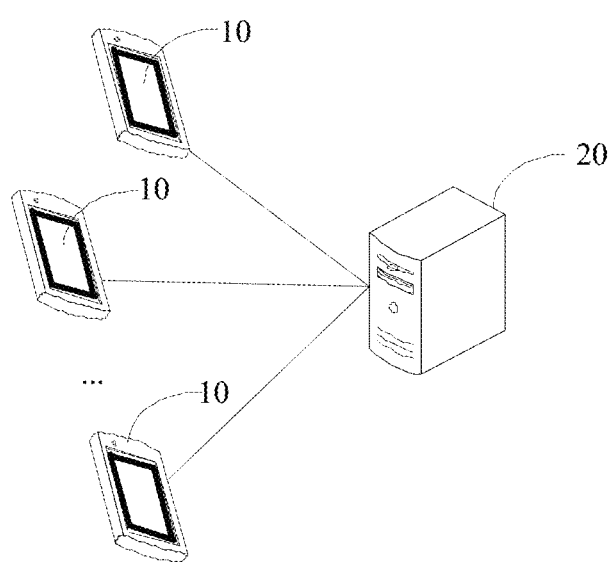
FIG. 2 is a schematic structural diagram of a system for exchanging information in an application service according to an embodiment of this application.

This application discloses a system for exchanging information in an application service providing a hardware implementation architecture for the method for exchanging information in an application service. Referring to FIG. 2, FIG. 2 is a schematic structural diagram of a system for exchanging information in an application service according to an embodiment of this application. The system may include:

several clients 10 located in a same application service and a server 20 corresponding to the application service.

The client 10 may be configured to detect an operation performed by a user on a map object, obtain prompt information based on the operation, obtain an identifier corresponding to the prompt information, generate a synchronization instruction based on the identifier corresponding to the prompt information, and send the synchronization instruction to the server 20.

The server 20 is configured to perform consistency rule checking on a synchronization instruction, to ensure validity and standardization of the synchronization instruction, and send the synchronization instruction to all clients 10 after the checking on the synchronization instruction is passed. The clients include a client uploading the synchronization instruction.

When receiving the synchronization instruction sent by the server 20, the clients 10 display the prompt information on respective map objects.

The special effect icon is used as a communication signal agreed between the clients 10 in advance, and can greatly facilitate information exchange between users.

The client 10 may be an electronic device having an installed service application, for example, a smartphone or an iPAD. The server 20 may be an application server corresponding to the service application, and may be a server cluster formed by one or more servers, or a cloud platform.

Figure 3:
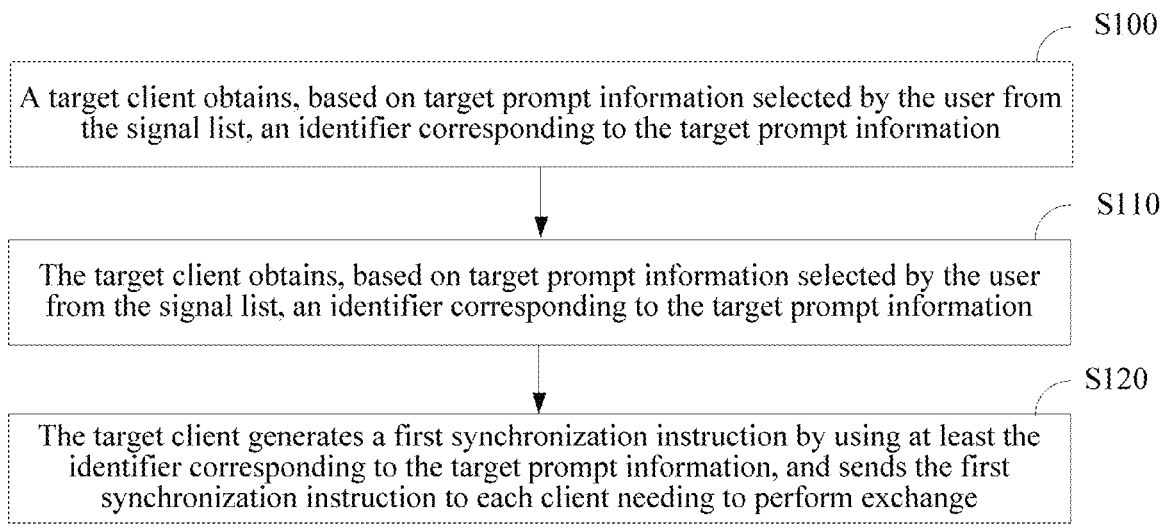
FIG. 3 is a schematic flowchart of a method for exchanging information in an application service according to an embodiment of this application.

Next, in embodiments of this application, the method for exchanging information in an application service in this application is described based on any client 10. For ease of description, the client 10 is referred to as a target client. FIG. 3 is a schematic flowchart of a method for exchanging information in an application service according to an embodiment of this application. As shown in FIG. 3, the method includes the following steps:

Step S100. The target client displays, when detecting that a user performs a first operation on a map object in a service scenario, a signal list corresponding to the first operation, the signal list including several pieces of set prompt information.

The map object is a mapped image for a master map of the service scenario.

The first operation may be a set operation, such as a tap, a touch and hold, and a double tap. When detecting that the user performs the first operation on the map object, the client may obtain a preset signal list corresponding to the first operation, and display the signal list on the map object.

The signal list may include several pieces of set prompt information. The signal list may be a signal wheel, the signal wheel includes several set regions, and each region corresponds to one piece of prompt information. The prompt information may be set according to a requirement in the service scenario.

Figure 4:
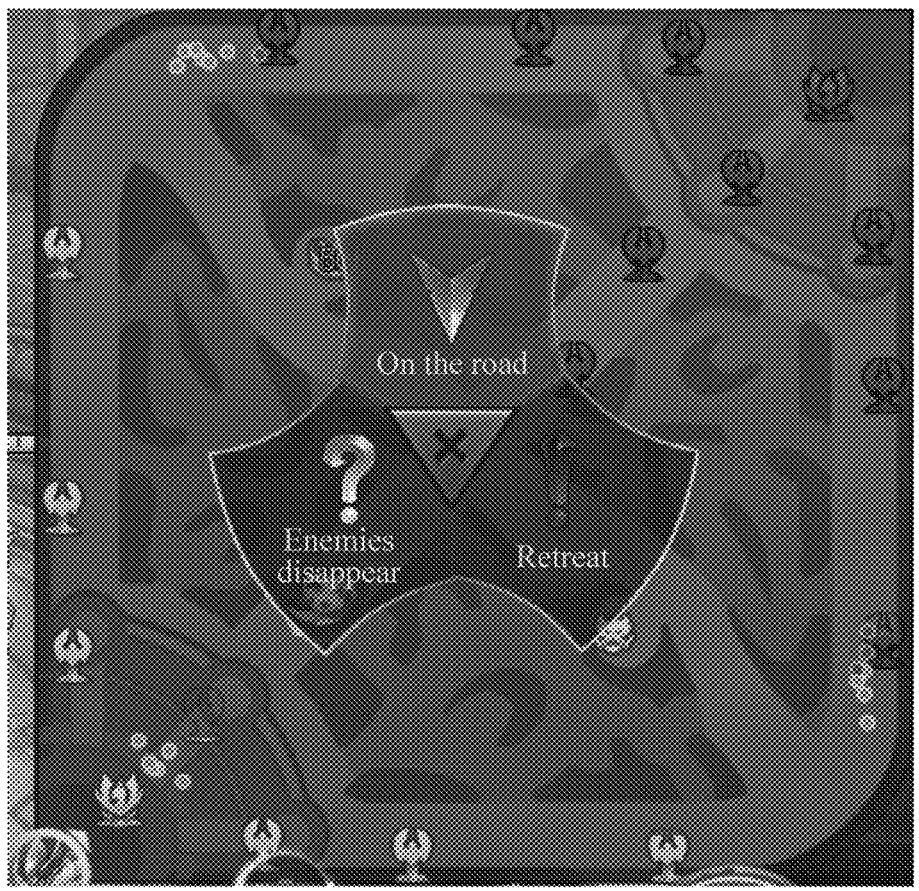
FIG. 4 is a schematic diagram showing effects of a signal wheel presented on a map object.

Referring to FIG. 4, FIG. 4 is a schematic diagram showing effects of a signal wheel presented on a map object. The signal wheel includes three pieces of set prompt information: "on the road", "enemies disappear", and "retreat". In addition, an exit control is included in the center of the signal wheel. In FIG. 4, each region of the signal wheel further includes a special effect icon corresponding to the prompt information. That the prompt information is "enemies disappear" is used as an example, a special effect icon corresponding to the prompt information may be an icon in a form of "?".

Certainly, FIG. 4 shows only one optional form of the signal list. In addition to this form, the signal list may be in another form, and the prompt information included in the signal list is not limited to those shown in FIG. 4 either.

In an implementation of this embodiment of this application, the method may further include: obtaining an operation location of the first operation on the map object. Correspondingly, after the obtaining the operation location of the first operation on the map object, in the step of "displaying a signal list corresponding to the first operation" in S100, specifically, the signal list corresponding to the first operation may be displayed at the operation location on the map object.

That the first operation is a touch and hold is used as an example. A process of obtaining the operation location of the first operation on the map object may include: when it is detected duration of a pressing operation performed by the user on the map object in the service scenario exceeds a first time threshold, the pressing operation is a first pressing operation, and then, a pressing location of the first pressing operation on the map object is obtained.

Step S110. The target client obtains, based on target prompt information selected by the user from the signal list, an identifier corresponding to the target prompt information.

Specifically, the user can select a piece of prompt information from the several pieces of prompt information presented in the signal list, as the target prompt information. The target client obtains the identifier corresponding to the target prompt information.

The target client may prestore a correspondence between each piece of prompt information and each identifier. Each piece of prompt information has a unique and unduplicated identifier. The identifier may be a digit ID, a character, or a combination of a character and a digit.

A manner of determining the target prompt information selected by the user from the signal list varies with a manner of performing the first operation by the user and a manner of presenting the signal list. In an example, the first operation is a touch and hold and the signal list is presented in a form of a signal wheel. A process of determining the target prompt information selected by the user from the signal list may include:

determining an end location of the first pressing operation and a target region in which the end location is located in the signal wheel.

Specifically, the user may perform touching and holding to invoke the signal wheel. The user may keep the pressing operation, slide to a region of the signal wheel, and terminates the first pressing operation in the region. The client determines an end location of the first pressing operation and a target region in which the end location is located in the signal wheel, and uses prompt information corresponding to the target region as the target prompt information. Subsequently, the identifier corresponding to the target prompt information may be obtained.

In an implementation, the identifier corresponding to the target prompt information may be an identifier of a first special effect icon corresponding to the target prompt information.

The target client may prestore a correspondence between prompt information and identifiers of special effect icons. Each piece of prompt information corresponds to one special effect icon, and each special effect icon has a unique and unduplicated identifier. The special effect icon may be a communication signal agreed between clients in advance. Presenting the special effect icon on the client may replace literary input, facilitating quick information exchange between users.

Step S120. The target client generates a first synchronization instruction by using at least the identifier corresponding to the target prompt information, and sends the first synchronization instruction to each client needing to perform exchange.

The first synchronization instruction may be used for instructing each client needing to perform exchange to display the target prompt information corresponding to the identifier corresponding to the target prompt information.

Specifically, the target client may generate the first synchronization instruction by using the obtained identifier corresponding to the target prompt information, and further, send the first synchronization instruction to a server, so that the server performs consistency rule checking, and sends, after the checking is passed, the first synchronization instruction to each client 10 needing to perform information exchange. The client 10 displays, at the operation location on the map object, the target prompt information corresponding to the identifier corresponding to the target prompt information.

When the clients needing to perform information exchange join the service scenario, the server may create a room for the clients. Subsequently, when receiving a synchronization instruction sent by any client in the room, after the consistency rule checking is passed, the server sends the synchronization instruction to all clients in the room.

In an implementation, if the operation location of the first operation on the map object may be obtained, the first synchronization instruction may be further generated by using the operation location. The first synchronization instruction may be specifically used for instructing each client 10 to display the target prompt information at the operation location on the map object.

In addition, if the identifier corresponding to the target prompt information is an identifier of a first special effect icon corresponding to the target prompt information, the client may display the target prompt information at the operation location on the map object. Specifically, the client may display, at the operation location by using the identifier of the first special effect icon corresponding to the target prompt information, the first special effect icon corresponding to the target prompt information.

Specifically, the target client may generate the first synchronization instruction by using the obtained operation location and the identifier corresponding to the special effect icon, and further, send the synchronization instruction to a server, so that the server performs consistency rule checking, and sends, after the checking is passed, the first synchronization instruction to each client 10 needing to perform information exchange. The client 10 displays, at the operation location on the map object, the first special effect icon corresponding to the identifier corresponding to the first special effect icon.

According to the method for exchanging information in an application service provided in this embodiment of this application, the user can be supported in performing the first operation on the map object in the service scenario, and displaying the corresponding signal list based on the first operation. Several pieces of prompt information are preset in the signal list. Therefore, the user may select the target prompt information from the signal list. Further, a target client obtains the identifier corresponding to the target prompt information, and generates the first synchronization instruction by using the identifier corresponding to the target prompt information, to instruct each client needing to perform exchange to display the target prompt information on the map object. In addition, the target prompt information is a signal agreed between the clients through communication in advance. Therefore, the user can send, to a client of another user by using the target client in a relatively convenient manner, information that the user wants to transmit to the another user, so as to greatly facilitate information exchange between the users.

Figure 5:
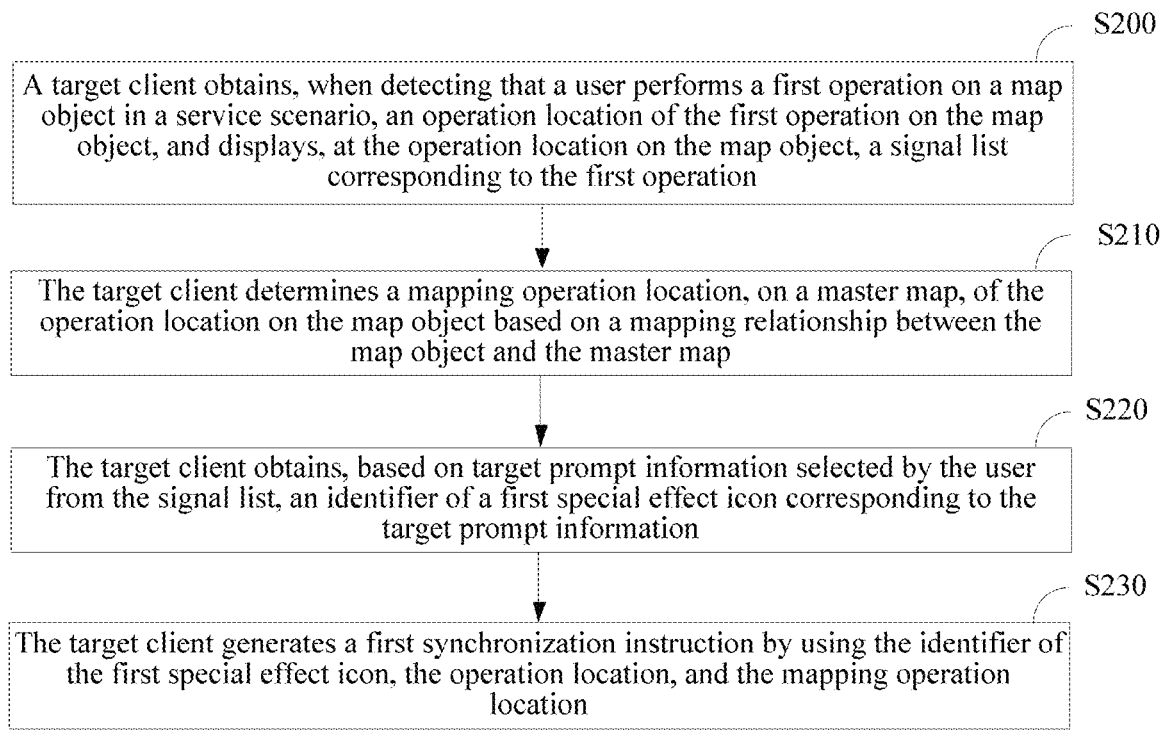
FIG. 5 is a schematic flowchart of another method for exchanging information in an application service according to an embodiment of this application.

Referring to FIG. 5, FIG. 5 is a schematic flowchart of another method for exchanging information in an application service according to an embodiment of this application. As shown in FIG. 5, the method may include the following steps:

Step S200. A target client obtains, when detecting that a user performs a first operation on a map object in a service scenario, an operation location of the first operation on the map object, and displays, at the operation location on the map object, a signal list corresponding to the first operation, the signal list including several pieces of set prompt information.

The map object may be a mapped image for a master map of the service scenario.

Step S210. The target client determines a mapping operation location, on a master map, of the operation location on the map object based on a mapping relationship between the map object and the master map.

Specifically, the foregoing has described the mapping relationship between the map object in the service scenario and the master map. The map object may be considered as a display effect obtained after the master map is scaled down by a scaling factor. It may be understood that, any location on the map object has a unique mapping location on the master map. Therefore, location conversion may be performed between the map object and the master map by using a fixed location mapping relationship.

Based on this, in this step, the mapping operation location, on the master map, of the operation location on the map object may be determined based on the mapping relationship between the map object and the master map.

Step S220. The target client obtains, based on target prompt information selected by the user from the signal list, an identifier of a first special effect icon corresponding to the target prompt information.

Step S230. The target client generates a first synchronization instruction by using the identifier of the first special effect icon, the operation location, and the mapping operation location.

The first synchronization instruction may be used for instructing each client needing to perform exchange to display, at the operation location on the map object, the first special effect icon corresponding to the identifier of the first special effect icon, and to display, at the mapping operation location on the master map, the first special effect icon corresponding to the identifier of the first special effect icon.

It may be understood that, step S210 and step S220 may be performed in any order or performed simultaneously.

Compared with the exchange method described in the foregoing embodiment, in this embodiment, after the operation location on the map object is obtained, further, the mapping operation location of the operation location on the master map may be determined. Then, the mapping operation location is further added to the first synchronization instruction, to instruct the target client to further synchronously display the first special effect icon at the mapping operation location on the master map. Compared with that the first special effect icon is displayed only on the map object, in this embodiment, the first special effect icon is further displayed on the master map, so that the user can precisely view a display location of the first special effect icon on the master map.

Figure 6A:
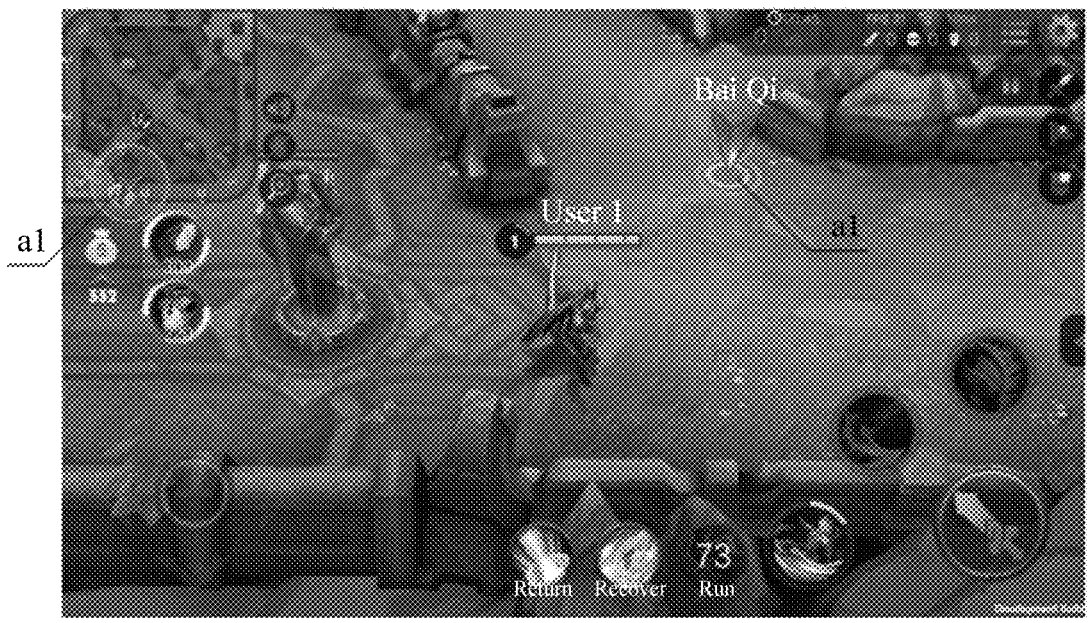
FIG. 6A to FIG. 6C are schematic diagrams showing effects of several special effect icons on a MOBA game interface.
Figure 6B:
Figure 6C:

Next, referring to FIG. 6A to FIG. 6C, a MOBA game interface is used as an example for description.

1. When the user slides upward in the signal wheel shown in FIG. 4 to select the prompt information of "on the road", according to the foregoing operation in this application, a display effect on a game interface of the target client is shown in FIG. 6A. A special effect icon a1 is displayed at the operation location on the map object, and the special effect icon a1 is also displayed on the master map.

2. When the user slides to the lower right in the signal wheel shown in FIG. 4 to select the prompt information of "retreat", according to the foregoing operation in this application, a display effect on a game interface of the target client is shown in FIG. 6B. A special effect icon b1 is displayed at the operation location on the map object, and the special effect icon b1 is also displayed on the master map.

3. When the user slides to the lower left in the signal wheel shown in FIG. 4 to select the prompt information of "enemies disappear", according to the foregoing operation in this application, a display effect on a game interface of the target client is shown in FIG. 6C. A special effect icon c1 is displayed at the operation location on the map object, and the special effect icon c1 is also displayed on the master map.

In an implementation, the target prompt information may be used for instruct to gather towards the operation location on the map object. The first special effect icon corresponding to the target prompt information includes a direction indication icon, and the direction indication icon is used for indicating a direction, relative to the operation location, of a location of a character model controlled by the client in the service scenario.

Figure 6D:
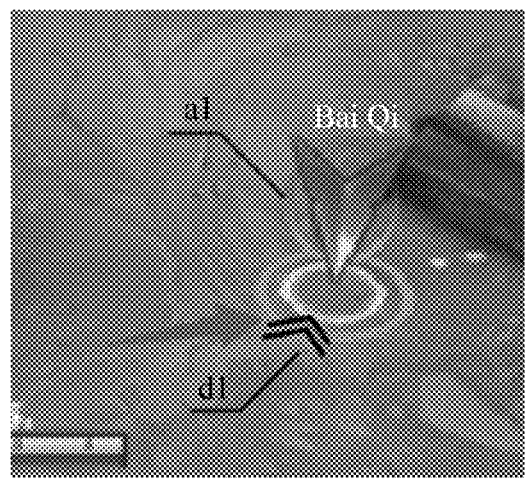
FIG. 6D is an enlarged view of a special effect icon displayed on a master map in FIG. 6A.

Next, descriptions are provided with reference to FIG. 6D.

FIG. 6D is an enlarged view of the special effect icon displayed on the master map in FIG. 6A. It can be learned from FIG. 6D, the special effect icon includes one direction indication icon d1. A vent direction of the direction indication icon d1 indicates that character models controlled by all clients rush over from this direction to provide support. In this way, when other teammates see the signal, the teammates may control the character models controlled by all the clients to run towards this direction by understanding each other, to gather together with a character model controlled by the target client.

Another method for exchanging information in an application service is described in still another embodiment of this application. Before the method is described, the map object in the service scenario is first described.

In this embodiment, it is further limited that the service scenario may further include an original map object. The map object may be a display effect image obtained after the original map object is amplified. There is a mapping relationship between every two of the original map object, the map object, and the master map.

The map object obtained after the original map object is amplified, so that the user can perform an operation on the map object, avoiding a false operation.

Figure 7:
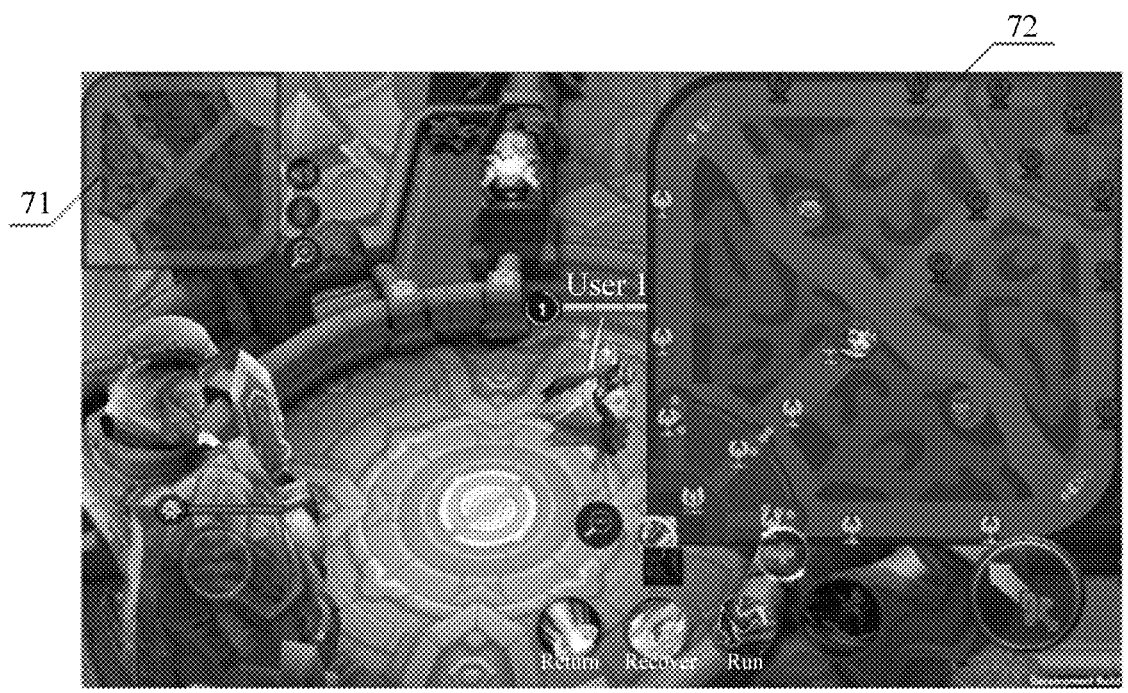
FIG. 7 is a schematic diagram of a positional relationship between an original map object and a map object.

Referring to FIG. 7, FIG. 7 shows a positional relationship between an original map object and a map object. An original map object 71 is located in an upper left corner of a screen, and a map object 72 is located in an upper right corner of the screen. A zoom in icon may further be disposed on the original map object 71, so that the amplified map object 72 can be displayed after the user taps the zoom in icon. In addition, a zoom out icon may also be disposed on the amplified map object 72, so that the map object 72 can be hidden after the user taps the zoom out icon, and only the original map object 71 is displayed.

Based on this, the user may further perform various operations on the amplified map object 72, and the first special effect icon may further be displayed on the original map object 71 and the master map.

Figure 8:
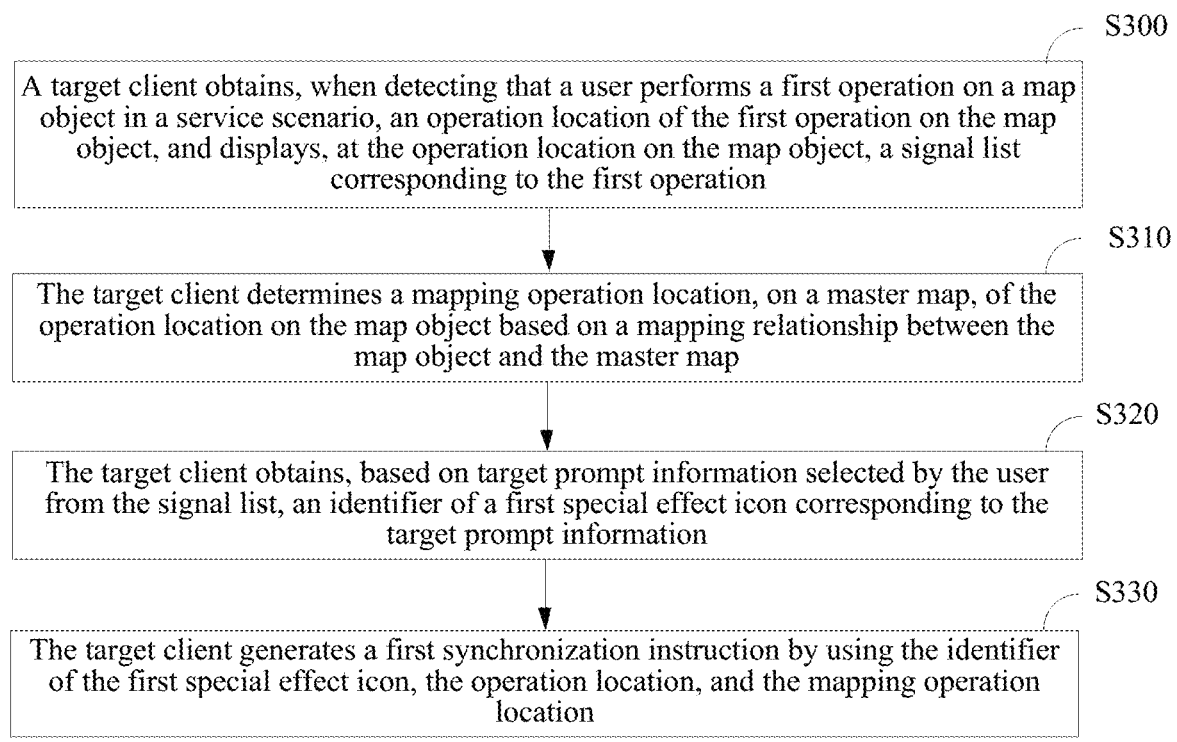
FIG. 8 is a schematic flowchart of still another method for exchanging information in an application service according to an embodiment of this application.

Referring to FIG. 8, FIG. 8 is a schematic flowchart of still another method for exchanging information in an application service according to an embodiment of this application. As shown in FIG. 8, the method may include the following steps:

Step S300. A target client obtains, when detecting that a user performs a first operation on a map object in a service scenario, an operation location of the first operation on the map object, and displays, at the operation location on the map object, a signal list corresponding to the first operation, the signal list including several pieces of set prompt information.

The map object is an amplified the map object of an original map object.

Optionally, the map object may be automatically hidden after the user performs an operation, and only the original map object is displayed.

Step S310. The target client obtains, based on target prompt information selected by the user from the signal list, an identifier of a first special effect icon corresponding to the target prompt information.

Step S320. The target client determines an original mapping operation location, on an original map object, of the operation location on the map object based on a mapping relationship between the original map object and the map object.

Specifically, there is a mapping relationship between the original map object and the map object. Coordinate locations of the original map object and the map object may be interchanged. In this step, the original mapping operation location, on the original map object, of the operation location on the map object may be determined.

Step S330. The target client generates a first synchronization instruction by using the identifier of the first special effect icon and the original mapping operation location.

The first synchronization instruction may be further used for instructing each client needing to perform exchange to display, at the original mapping operation location on the original map object, the first special effect icon corresponding to the identifier of the first special effect icon.

In this embodiment, the user may perform the first operation on the amplified map object, and the first special effect icon may be finally displayed on an original map. It can be determined with reference to the foregoing embodiment that, in this embodiment of this application, the first special effect icon may further be displayed on the master map simultaneously.

Optionally, in this embodiment of this application, it may also be set the first special effect icon is displayed on the map object simultaneously. In this way, the operation location of the first operation on the map object also needs to be added to the first synchronization instruction.

Figure 9:
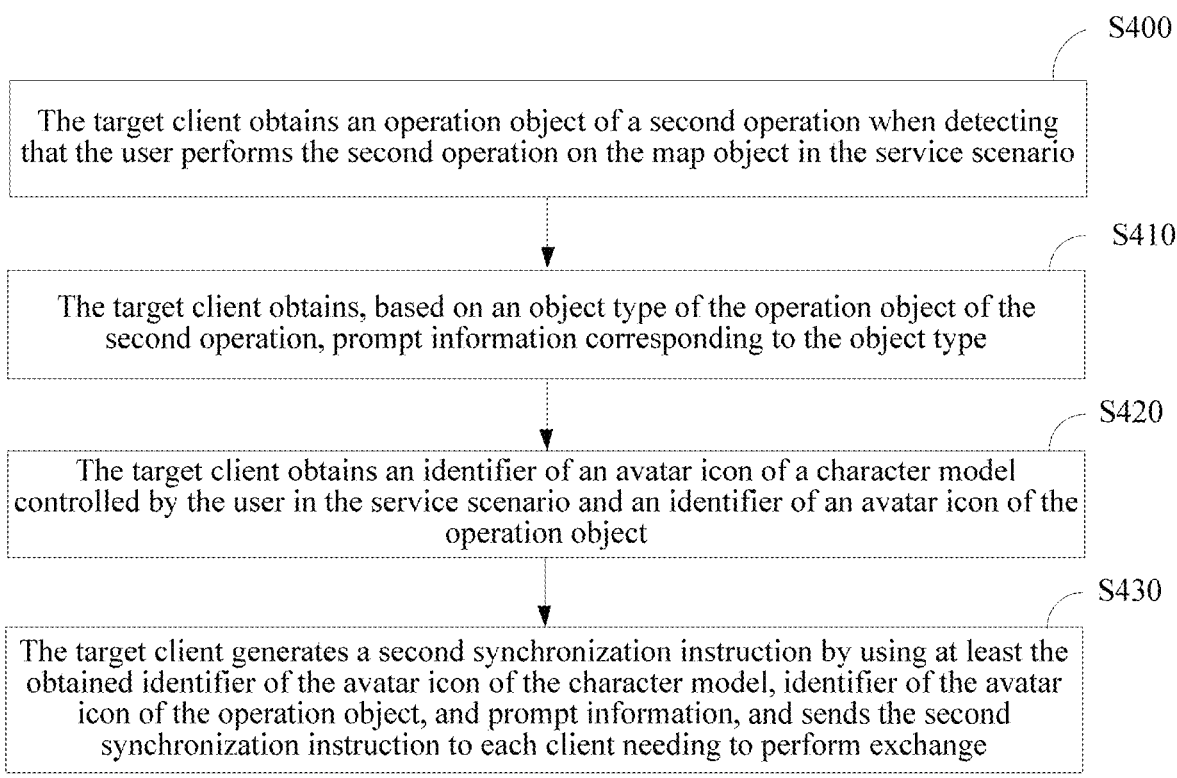
FIG. 9 is a schematic flowchart of still another method for exchanging information in an application service according to an embodiment of this application.

Based on the foregoing embodiments, an embodiment of this application further describes the method for exchanging information in an application service. Referring to FIG. 9, FIG. 9 is a flowchart of still another method for exchanging information in an application service according to an embodiment of this application. Based on implementation steps in the foregoing embodiments, this embodiment of this application may further include the following operation procedures:

Step S400. The target client obtains an operation object of a second operation when detecting that the user performs the second operation on the map object in the service scenario.

Specifically, the second operation is different from the first operation. In an optional implementation, the second operation may be a second pressing operation whose duration does not exceed the first time threshold. For example, the first operation may be a touch and hold if a pressing time exceeds the first time threshold, and the second operation may be a tap if a pressing time is less than the first time threshold. It should be noted that, in this step, when it is detected that the user performs the second operation on the map object, the operation object of the second operation may be obtain. For example, when the second operation is the second pressing operation, an operation object of the second pressing operation may be obtained. A specific implementation may include the following steps:

On the map object, an operation object of a set type may be searched for around the operation location of the second operation, for example, a set range near the operation location of the second operation. In an example of a game application, operation objects of a set type may include enemy characters, ally characters, enemy turrets, ally turrets, NPCs, buffs, and the like. Certainly the operation objects of the set type may further include a map region. That is, if the foregoing operation objects are not included in the set range, an empty map region may be alternatively used as an operation object of a set type.

According to the concept of the map object described in the foregoing embodiment, in this step, the second operation may be directly performed on the original map object. Certainly, the second operation may be alternatively performed on the amplified map object.

Step S410. The target client obtains, based on an object type of the operation object of the second operation, prompt information corresponding to the object type.

Specifically, prompt information corresponding to various object types may be preset in this embodiment of this application, thereby obtaining the corresponding prompt information after determining the object type of the operation object of the second operation.

Step S420. The target client obtains an identifier of an avatar icon of a character model controlled by the user in the service scenario and an identifier of an avatar icon of the operation object.

Specifically, the user may perform an operation in the service scenario by controlling the character model. In this step, the identifier of the avatar icon of the character model controlled in the service scenario by the user logging in to the current target client and the identifier of the avatar icon of the operation object may be obtained.

It may be understood that, each operation object has a corresponding avatar icon in the service scenario, to indicate an identity of the operation object. It may be understood that, different avatar icons correspond to different identifiers.

Herein, the character model controlled by the user may be an object sending the prompt information, and the operation object may be an object targeted by the prompt information. In an example of a game service scenario, if the user controls a character A and taps the first turret of the enemies, prompt information corresponding to the first turret may be "attack".

In this way, it may indicate that the character A initiates an information prompt instructing to attach the first turret of the enemies.

Step S430. The target client generates a second synchronization instruction by using at least the obtained identifier of the avatar icon of the character model, identifier of the avatar icon of the operation object, and prompt information, and sends the second synchronization instruction to each client needing to perform exchange.

The second synchronization instruction may be used for instructing each client needing to perform exchange to display the avatar icon of the character model, the avatar icon of the operation object, and the prompt information. In this embodiment, the clients may agree in advance about prompt information corresponding to different operation object types, thereby performing the second operation on a designated operation object on the map object. Corresponding prompt information, an avatar icon of a character model sending the prompt information, and an avatar icon of an object targeted by the prompt information can be displayed in each client.

Figure 10:
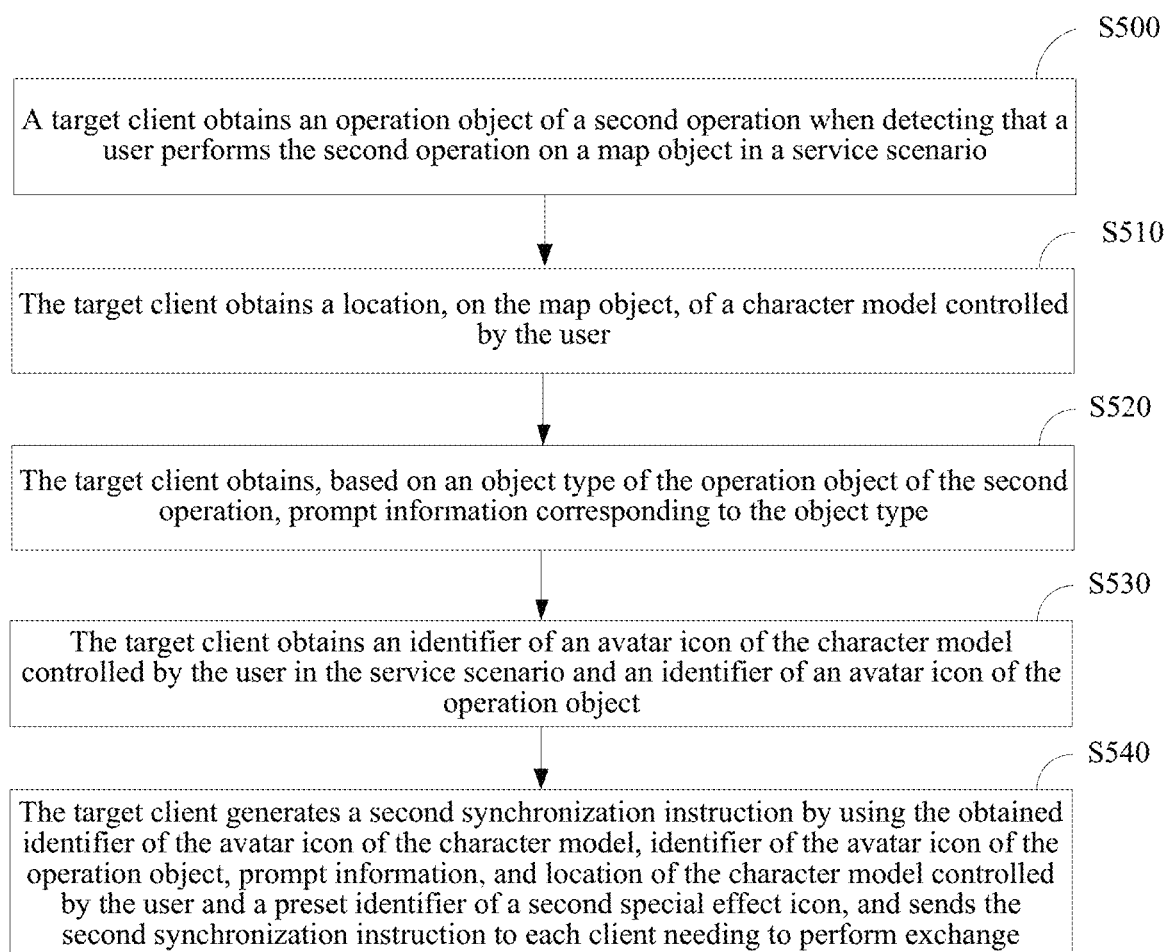
FIG. 10 is a schematic flowchart of still another method for exchanging information in an application service according to an embodiment of this application.
Figure 11A:
FIG. 11A to FIG. 11F are schematic diagrams showing effects of several pieces of prompt information on a MOBA game interface.
Figure 11B:
Figure 11C:
Figure 11D:
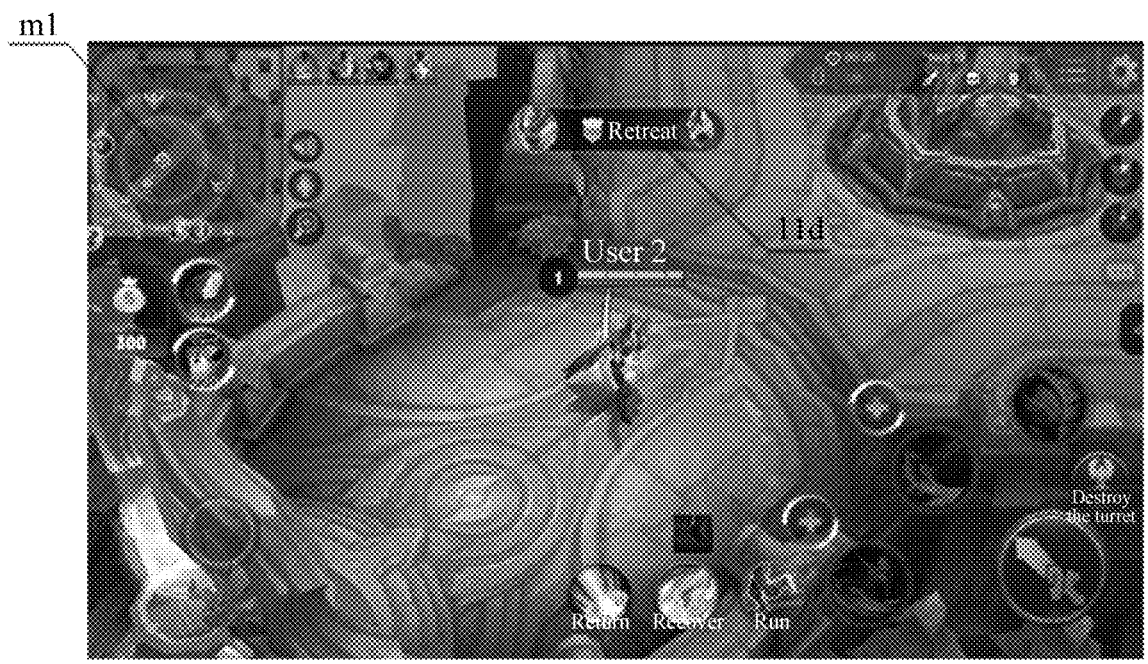
Figure 11E:
Figure 11F:
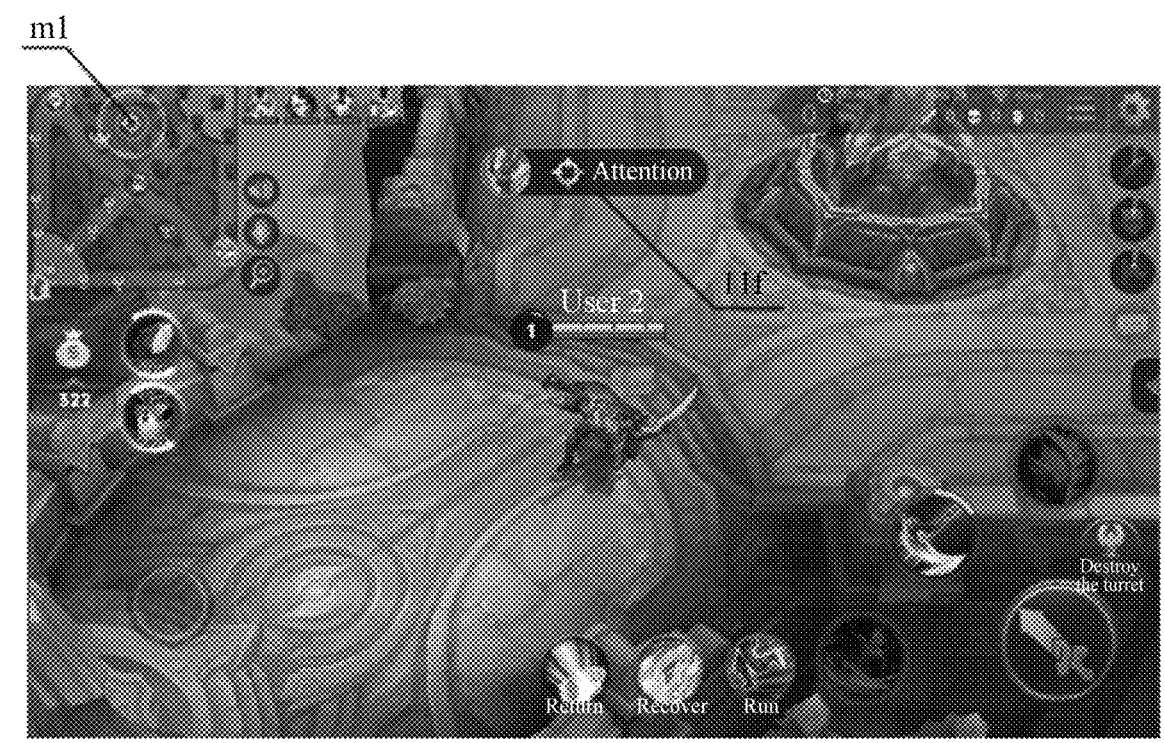

Based on the foregoing embodiment, an embodiment further discloses a flowchart of still another method for exchanging information in an application service. Referring to FIG. 10, the method further includes the following steps:

Step S500. The target client obtains an operation object of a second operation when detecting that the user performs the second operation on the map object in the service scenario.

Step S510. The target client obtains a location, on the map object, of a character model controlled by the user.

Specifically, the map object herein may be an original map object or an amplified map object of an original map object. If the map object is an amplified map object of an original map object, the location of the character model on the map object is converted into an original mapping character model location on an original map object.

Step S520. The target client obtains, based on an object type of the operation object of the second operation, prompt information corresponding to the object type.

Step S530. The target client obtains an identifier of an avatar icon of the character model controlled by the user in the service scenario and an identifier of an avatar icon of the operation object.

Step S540. The target client generates a second synchronization instruction by using the obtained identifier of the avatar icon of the character model, identifier of the avatar icon of the operation object, prompt information, and location of the character model controlled by the user and a preset identifier of a second special effect icon, and sends the second synchronization instruction to each client needing to perform exchange.

The second synchronization instruction may be used for instructing each client needing to perform exchange to display the avatar icon of the character model, the avatar icon of the operation object, and the prompt information, and display the second special effect icon at the location of the character model controlled by the user on the map object.

The location of the character model controlled by the user may be a location of the character model on the original map object.

Compared with the foregoing embodiment, in this embodiment, a process of displaying the second special effect icon at the location of the character model on the map object is further added. The second special effect icon is used for indicating a location of a character model sending the prompt information.

Next, referring to FIG. 11A to FIG. 11F, a MOBA game interface is used as an example for description.

1. When the user taps an avatar of an enemy character on the map object, an operation may be performed according to the foregoing step in this embodiment of this application. In this case, a display effect on a game interface the target client may be shown in FIG. 11A. On the screen, attack prompt information 11A may be displayed, and a target special effect icon m1 is displayed at a location at which a character model can send the prompt information on the map object, to mark the location of the character model.

The attack prompt information 11A may include an avatar icon of the character model sending the prompt information, a prompt, and the avatar icon of the operation object.

2. When the user taps an avatar of an ally character on the map object, an operation may be performed according to the foregoing step in this embodiment of this application. In this case, a display effect on a game interface the target client may be shown in FIG. 11B. On the screen, protect prompt information 11B may be displayed, and a target special effect icon m1 is displayed at a location at which a character model can send the prompt information on the map object, to mark the location of the character model.

The protect prompt information 11B may include an avatar icon of the character model sending the prompt information, a prompt, and the avatar icon of the operation object.

3. When the user taps an enemy turret on the map object, an operation may be performed according to the foregoing step in this embodiment of this application. In this case, a display effect on a game interface the target client may be shown in FIG. 11C. On the screen, attack prompt information 11C may be displayed, and a target special effect icon m1 is displayed at a location at which a character model can send the prompt information on the map object, to mark the location of the character model.

The attack prompt information 11C may include an avatar icon of the character model sending the prompt information, a prompt, and the avatar icon of the operation object.

4. When the user taps an ally turret on the map object, an operation may be performed according to the foregoing step in this embodiment of this application. In this case, a display effect on a game interface the target client may be shown in FIG. 11D. On the screen, protect prompt information 11D may be displayed, and a target special effect icon m1 is displayed at a location at which a character model can send the prompt information on the map object, to mark the location of the character model.

The protect prompt information 11D may include an avatar icon of the character model sending the prompt information, a prompt, and the avatar icon of the operation object.

5. When the user taps the king of glory/tyrant (NPCs in the game) on the map object, an operation may be performed according to the foregoing step in this embodiment of this application. In this case, a display effect on a game interface the target client may be shown in FIG. 11E. On the screen, attack prompt information 11E is displayed, and a target special effect icon m1 is displayed at a location at which a character model can send the prompt information on the map object, to mark the location of the character model.

The attack prompt information 11E may include an avatar icon of the character model sending the prompt information, a prompt, and the avatar icon of the operation object.

6. When the user taps an empty map region on the map object, an operation may be performed according to the foregoing step in this embodiment of this application. In this case, a display effect on a game interface the target client may be shown in FIG. 11F. On the screen, attention prompt information 11F is displayed, and a target special effect icon m1 is displayed at a location at which a character model can send the prompt information on the map object, to mark the location of the character model.

The attention prompt information 11F may include an avatar icon of the character model sending the prompt information and a prompt.

It should be noted that, in an implementation, if the service scenario may further include the original map object, step S540 may further include the following steps: first, determining, based on the mapping relationship between the original map object and the map object, an original mapping character model location on the original map object that is of the location of the character model controlled by the user; and then, generating the second synchronization instruction by using the identifier of the avatar icon of the character model, the identifier of the avatar icon of the operation object, the prompt information, the original mapping character model location, and the preset identifier of the second special effect icon, and sending the second synchronization instruction to each client needing to perform exchange, the second synchronization instruction being further used for instructing the client to display, at the original mapping character model location, the special effect icon corresponding to the identifier of the second special effect icon.

Figure 12:
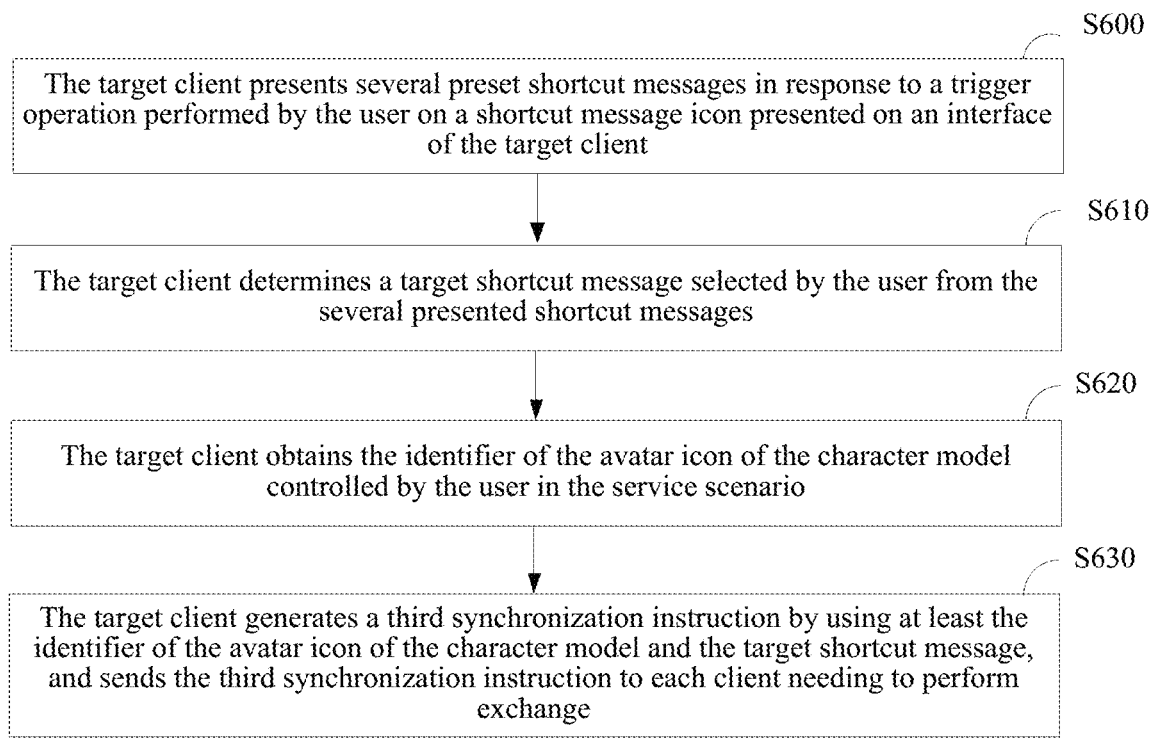
FIG. 12 is a schematic flowchart of still another method for exchanging information in an application service according to an embodiment of this application.

Based on the foregoing embodiment, an embodiment of this application may further describe the method for exchanging information in an application service. Referring to FIG. 12, FIG. 12 is a flowchart of still another method for exchanging information in an application service according to an embodiment of this application. Based on implementation steps in the foregoing embodiments, the method provided in this embodiment of this application may further include the following operation procedures:

Step S600. The target client presents several preset shortcut messages in response to a trigger operation performed by the user on a shortcut message icon presented on an interface of the target client.

Specifically, in this embodiment of this application, the shortcut message icon may be preset on the interface of the target client. Before entering the service scenario, the user may set, on a shortcut message setting page, several shortcut messages needing to be presented. Further, the several preset shortcut messages may be presented by triggering the shortcut message icon in the service scenario.

Figure 13A:
FIG. 13A to FIG. 13B are schematic diagrams showing shortcut message icons on a MOBA game interface and displaying effects of presenting the shortcut messages.

Using a MOBA game as an example, it can be learned with reference to a game interface shown in FIG. 13A that, on a right side of the interface, a shortcut message icon 13 is provided. The several preset shortcut messages may be presented by triggering the shortcut message icon 13. An effect is shown in FIG. 13B, and several preset shortcut messages 14 are presented.

Figure 13B:

In addition, it can be learned from FIG. 13B that, in this embodiment of this application, the user may be further supported in inputting information in the service scenario, and specifically, inputting text in a text input box 15 in FIG. 13B. In addition, a sending object of the input information can be designated. In FIG. 13B, the sending object may be selected from a sending object selection box 16. For example, the sending object may be set as "allies", "enemies", "all users", and the like.

Figure 13C:
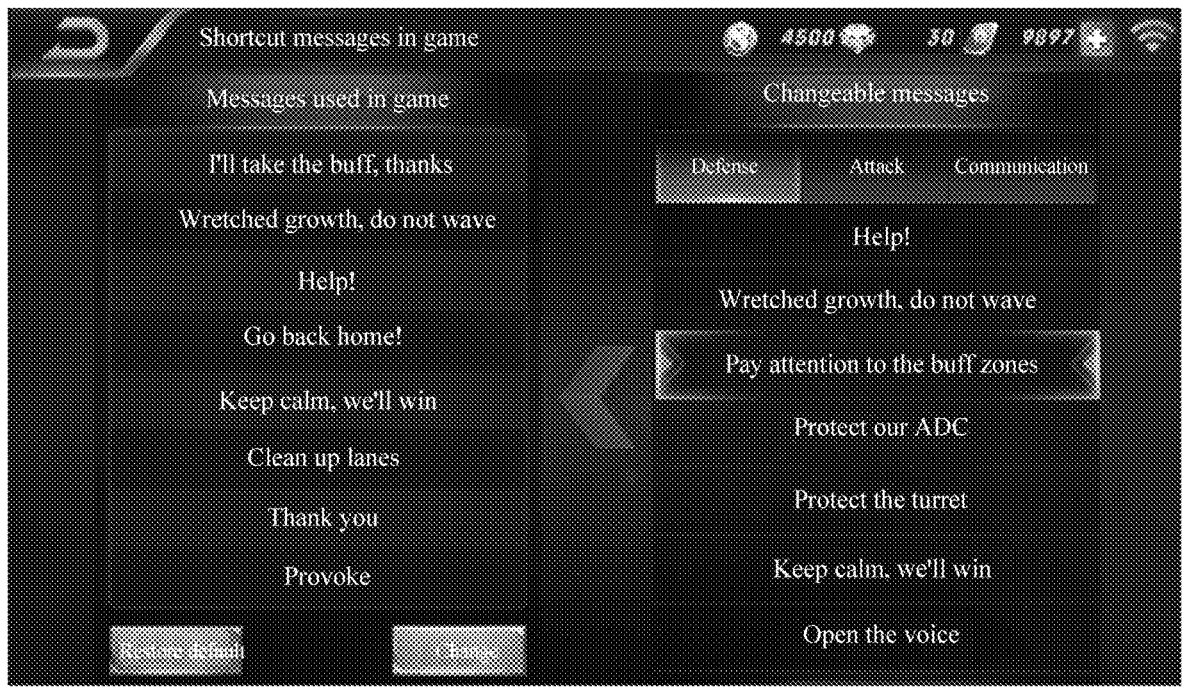
FIG. 13C is a schematic diagram of setting a shortcut message interface in a MOBA game.

Further, considering limited space of a shortcut message prompt interface, only a particular number of shortcut messages can be presented. In this embodiment of this application, a shortcut message setting interface may also be provided. Referring to FIG. 13C, the user may select, from the page, a shortcut message commonly used by the user. The shortcut messages may be presented after being classified by function, so that the user conveniently searches for a needed shortcut message.

Step S610. The target client determines a target shortcut message selected by the user from the several presented shortcut messages.

Step S620. The target client obtains the identifier of the avatar icon of the character model controlled by the user in the service scenario.

Step S630. The target client generates a third synchronization instruction by using at least the identifier of the avatar icon of the character model and the target shortcut message, and sends the third synchronization instruction to each client needing to perform exchange, the third synchronization instruction being used for instructing each client needing to perform exchange to display the avatar icon of the character model and the target shortcut message.

In this embodiment, the user may invoke a preset shortcut message list by using the shortcut message icon provided on a service scenario interface, and select, from the list, the target shortcut message that needs to be used. The target client may generate the third synchronization instruction based on the target shortcut message and the identifier of the avatar icon of the character model, to instruct each client to display the identifier of the avatar icon of the character model and the target shortcut message, so that the clients can quickly perform information exchange.

In an implementation, the client may present the target shortcut message in text form or broadcast the target shortcut message in speech form.

Figure 13D:
FIG. 13D is a schematic diagram of prompt effects of shortcut messages on a MOBA game interface.

Referring to FIG. 13D, FIG. 13D shows a display effect of presenting shortcut messages on the game interface. The target client may present shortcut message prompt information 17 on the display interface. The prompt information 17 may include an avatar of a character model sending a shortcut message and content of the target shortcut message.

Further, it can be learned from FIG. 13D that, in this embodiment of this application, the location, on the map object, of the character model controlled by the user on the map object may further be obtained. The location and an identifier of a third special effect icon are added to the third synchronization instruction, to instruct the client to display the third special effect icon m1 at the location of the character model on the map object.

In conclusion, in this embodiment of this application, information exchange between the clients is implemented by using a map signal prompt, a shortcut message prompt, and a text input prompt, greatly facilitating information exchange between mobile phone terminal users in the service scenario.

For the system for exchanging information in an application service disclosed in the embodiments of this application, the target client of the system can perform the method for exchanging information in an application service according to the foregoing embodiments, and send a generated synchronization instructions to a server. The server performs consistency rule checking on the synchronization instruction sent by the target client, and sends the synchronization instruction to each client after determining that the checking is passed, to instruct the client to execute the synchronization instruction.

Optionally, before performing consistency rule checking on the synchronization instruction sent by the target client, the server may further determine a difference between a time for the target client to send a previous synchronization instruction and a current time; determine whether the difference exceeds a set time difference threshold; and if yes, perform the operation of performing consistency rule checking on the synchronization instruction sent by the target client; or if no, discard the synchronization instruction.

According to this policy, the target client can be prevented from sending a plurality of signals in a very short time, which causes a greater burden to both the server and the target client.

The set time difference threshold may be one second to three seconds, or another value.

Figure 13E:
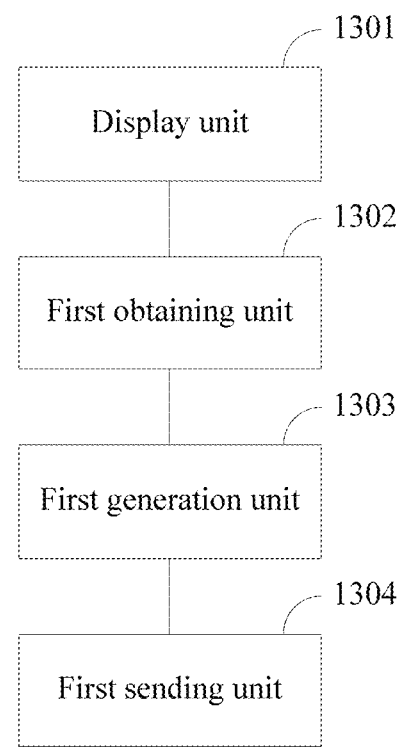
FIG. 13E is a schematic composition diagram of an apparatus for exchanging information in an application service according to an embodiment of this application.

Referring to FIG. 13E, corresponding to the foregoing methods, this application further discloses an apparatus for exchanging information in an application service. The apparatus includes:

a display unit 1301, configured to display, when detecting that a user performs a first operation on a map object in a service scenario, a signal list corresponding to the first operation, the signal list including several pieces of set prompt information, and the map object being a mapped image for a master map of the service scenario;

a first obtaining unit 1302, configured to obtain, based on target prompt information selected by the user from the signal list, an identifier corresponding to the target prompt information, the target prompt information being any one of the several pieces of prompt information;

a first generation unit 1303, configured to generate a first synchronization instruction by using at least the identifier corresponding to the target prompt information, the first synchronization instruction being used for instructing the client to display the target prompt information; and a first sending unit 1304, configured to send the first synchronization instruction to each client needing to perform exchange.

In an implementation, the apparatus further includes:

a second obtaining unit, configured to obtain an operation location of the first operation on the map object.

The display unit 1301 includes:

a display subunit, configured to display, at the operation location, the signal list corresponding to the first operation.

In an implementation, the first synchronization instruction is further generated by using the operation location, and the first synchronization instruction is specifically used for instructing the client to display the target prompt information at the operation location on the map object.

In an implementation, the identifier corresponding to the target prompt information is an identifier of a first special effect icon corresponding to the target prompt information.

The displaying, by the client, the target prompt information at the operation location on the map object is specifically: displaying, by the client at the operation location by using the identifier of the first special effect icon corresponding to the target prompt information, the first special effect icon corresponding to the target prompt information.

In an implementation, the apparatus further includes:

a first determining unit, configured to determine a mapping operation location, on the master map, of the operation location on the map object based on a mapping relationship between the map object and the master map.

The first synchronization instruction is further generated by using the mapping operation location, and the first synchronization instruction is further used for displaying, at the mapping operation location on the master map, a special effect icon corresponding to the identifier of the first special effect icon.

In an implementation, the first operation is a first pressing operation whose duration exceeds a first time threshold.

The second obtaining unit includes:

a first obtaining subunit, configured to obtain a pressing location of the first pressing operation on the map object.

In an implementation, the signal list is a signal wheel, the signal wheel includes several set regions, and each region corresponds to one piece of prompt information.

The first obtaining unit 1302 includes:

a determining subunit, configured to determine an end location of the first pressing operation and a target region in which the end location is located in the signal wheel; and a second obtaining subunit, configured to obtain, based on target prompt information corresponding to the target region, an identifier of a first special effect icon corresponding to the target prompt information.

In an implementation, the service scenario further includes an original map object, the map object is a display effect image obtained after the original map object is amplified, and there is a mapping relationship between every two of the original map object, the map object, and the master map.

The apparatus further includes:

a second determining unit, configured to determine an original mapping operation location, on the original map object, of the operation location on the map object based on the mapping relationship between the original map object and the map object.

The first synchronization instruction is further generated by using the original mapping operation location, and the first synchronization instruction is further used for instructing the client to display, at the original mapping operation location on the original map object, a special effect icon corresponding to the identifier of the first special effect icon.

In an implementation, the target prompt information is used for instructing to gather together towards the operation location on the map object.

The first special effect icon corresponding to the target prompt information includes a direction indication icon, and the direction indication icon is used for indicating a direction, relative to the operation location, of a location of a character model controlled by the client in the service scenario.

In an implementation, the apparatus further includes:

a third obtaining unit, configured to obtain an operation object of a second operation when detecting that the user performs the second operation on the map object in the service scenario;

a fourth obtaining unit, configured to obtain, based on an object type of the operation object, prompt information corresponding to the object type;

a fifth obtaining unit, configured to obtain an identifier of an avatar icon of a character model controlled by the user in the service scenario and an identifier of an avatar icon of the operation object;

a second generation unit, configured to generate a second synchronization instruction by using at least the identifier of the avatar icon of the character model, the identifier of the avatar icon of the operation object, and the prompt information; and a second sending unit, configured to send the second synchronization instruction to each client needing to perform exchange.

the second synchronization instruction being used for instructing the client to display the avatar icon of the character model, the avatar icon of the operation object, and the prompt information.

In an implementation, the apparatus further includes:

a sixth obtaining unit, configured to obtain a location, on the map object, of the character model controlled by the user.

The second generation unit includes:

a first generation subunit, configured to generate the second synchronization instruction by using the identifier of the avatar icon of the character model, the identifier of the avatar icon of the operation object, the prompt information, the location of the character model controlled by the user, and a preset identifier of a second special effect icon, the second synchronization instruction being specifically used for instructing the client to display, at the location of the character model controlled by the user, a special effect icon corresponding to the identifier of the second special effect icon.

In an implementation, the service scenario further includes an original map object, the map object is a display effect image obtained after the original map object is amplified, and there is a mapping relationship between every two of the original map object, the map object, and the master map.

The first generation subunit includes:

a determining module, configured to determine, based on the mapping relationship between the original map object and the map object, an original mapping character model location on the original map object that is of the location of the character model controlled by the user; and a generation module, configured to generate the second synchronization instruction by using the identifier of the avatar icon of the character model, the identifier of the avatar icon of the operation object, the prompt information, the original mapping character model location, and the preset identifier of the second special effect icon, the second synchronization instruction being further used for instructing the client to display, at the original mapping character model location, the special effect icon corresponding to the identifier of the second special effect icon.

In an implementation, the second operation is a second pressing operation whose duration does not exceed the first time threshold.

The third obtaining unit includes:

a third obtaining subunit, configured to obtain an operation object of the second pressing operation.

In an implementation, the apparatus further includes:

a presentation unit, configured to present several preset shortcut messages in response to a trigger operation performed by the user on a shortcut message icon presented on an interface of the target client;

a third determining unit, configured to determine a target shortcut message selected by the user from the several preset shortcut messages;

a seventh obtaining unit, configured to obtain the identifier of the avatar icon of the character model controlled by the user in the service scenario a third generation unit, configured to generate a third synchronization instruction by using at least the identifier of the avatar icon of the character model and the target shortcut message; and a third sending unit, configured to send the third synchronization instruction to each client needing to perform exchange, the third synchronization instruction being used for instructing the client to display the avatar icon of the character model and the target shortcut message.

In an implementation, the apparatus further includes:

an eighth obtaining unit, configured to obtain the location, on the map object, of the character model controlled by the user.

The third generation unit includes:

a second generation subunit, configured to generate the third synchronization instruction by using the identifier of the avatar icon of the character model, the target shortcut message, the location of the character model on the map object, and a preset identifier of a third special effect icon, the third synchronization instruction being further used for instructing the client to display, at the location of the character model, a special effect icon corresponding to the identifier of the third special effect icon.

Figure 14:
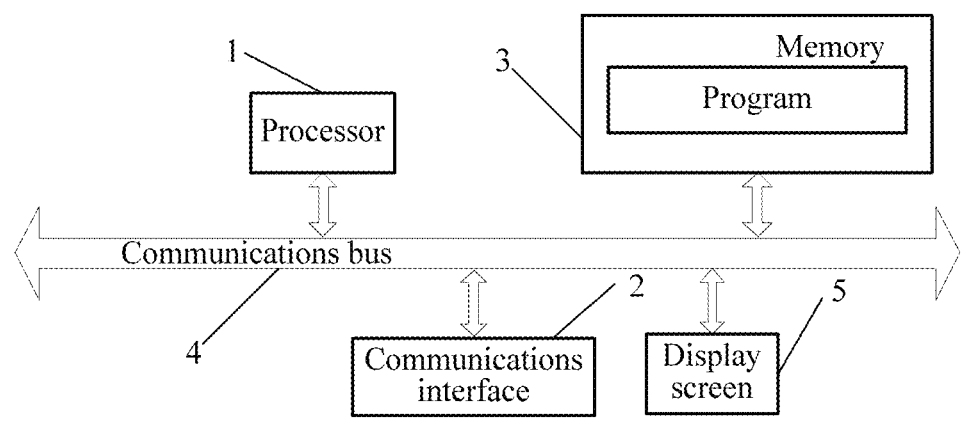
FIG. 14 is a schematic diagram of a hardware structure of a client according to an embodiment of this application.

A hardware structure of a client 10 is described in the following embodiment. Referring to FIG. 14, FIG. 14 is a schematic diagram of a hardware structure of a client according to an embodiment of this application.

As shown in FIG. 14, the client 14 may include:

a processor 1, a communications interface 2, a memory 3, a communications bus 4, and a display screen 5.

Communication among the processor 1, the communications interface 2, the memory 3, and the display screen 5 is implemented through the communications bus 4.

Optionally, the communications interface 2 may be an interface of a communications module, for example, an interface of a GSM module.

The processor 1 is configured to execute a program.

The memory 3 is configured to store a program.

The program may include program code, and the program code includes an operation instruction of the processor.

The processor 1 may be a central processing unit (CPU) or an application-specific integrated circuit (ASIC), or may be configured as one or more integrated circuits for implementing the embodiments of this application.

The memory 3 may include a high-speed RAM memory, and may further include a non-volatile memory, for example, at least one magnetic disk memory.

The program may be specifically used for:

obtaining, when detecting that a user performs a first operation on a map object in a service scenario, an operation location of the first operation on the map object, and displaying, at the operation location on the map object, a signal list corresponding to the first operation, the signal list including several pieces of set prompt information, and the map object being a mapped image for a master map of the service scenario;

obtaining, based on target prompt information selected by the user from the signal list, an identifier of a special effect icon corresponding to the target prompt information; and generating a synchronization instruction by using at least the identifier of the special effect icon and the operation location, the synchronization instruction being used for instructing each client needing to perform exchange to display, at the operation location on the map object, the special effect icon corresponding to the identifier of the special effect icon.

Figure 15:
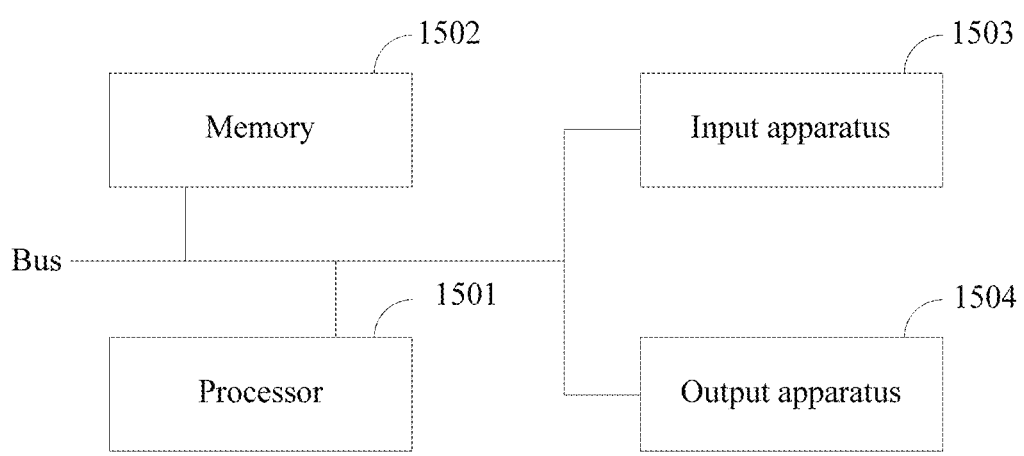
FIG. 15 is a schematic structural diagram of a device for exchanging information in an application service according to an embodiment of this application.

An embodiment of this application further provides a device for exchanging information in an application service. Referring to FIG. 15, the device may include:

a processor 1501, a memory 1502, an input apparatus 1503, and an output apparatus 1504. There may be one or more processors 1501 in a browser server. FIG. 8 uses one processor as an example. In some embodiments of the present disclosure, the processor 1501, the memory 1502, the input apparatus 1503, and the output apparatus 1504 may be connected by using a bus or in another manner. The input apparatus 1503 and the output apparatus 1504 may be interfaces of a communications module, for example, an interface of a GSM module. FIG. 8 uses a bus connection as an example.

The memory 1502 may be configured to store a software program and module. The processor 1501 runs the software program and module stored in the memory 1502, to implement various functional applications and data processing of the browser server. The memory 1502 may mainly include a program storage area and a data storage area. The program storage area may store an operating system, an application program required by at least one function, and the like. In addition, the memory 1502 may include a high speed random access memory, and may further include a non-volatile memory, such as at least one magnetic disk storage device, a flash memory, or other volatile solid-state storage devices. The input apparatus 1503 may be configured to receive input digit or character information, and generate a keyboard signal input related to user settings and function control of the browser server.

Specifically, in this embodiment, the processor 1501 may load, according to the following instructions, executable files corresponding to processes of one or more application programs into the memory 1502. The processor 1501 runs the application programs stored in the memory 1502, to implement various functions:

displaying, when detecting that a user performs a first operation on a map object in a service scenario, a signal list corresponding to the first operation, the signal list including several pieces of set prompt information, and the map object being a mapped image for a master map of the service scenario;

obtaining, based on target prompt information selected by the user from the signal list, an identifier corresponding to the target prompt information, the target prompt information being any one of the several pieces of prompt information; and generating a first synchronization instruction by using at least the identifier corresponding to the target prompt information, and sending the first synchronization instruction to each client needing to perform exchange, the first synchronization instruction being used for instructing the client to display the target prompt information.

In a possible implementation manner, before the displaying a signal list corresponding to the first operation, the method further includes:

obtaining an operation location of the first operation on the map object.

The displaying a signal list corresponding to the first operation includes:

displaying, at the operation location, the signal list corresponding to the first operation.

In a possible implementation manner, the first synchronization instruction is further generated by using the operation location, and the first synchronization instruction is specifically used for instructing the client to display the target prompt information at the operation location on the map object.

In a possible implementation manner, the identifier corresponding to the target prompt information is an identifier of a first special effect icon corresponding to the target prompt information.

The displaying, by the client, the target prompt information at the operation location on the map object is specifically: displaying, by the client at the operation location by using the identifier of the first special effect icon corresponding to the target prompt information, the first special effect icon corresponding to the target prompt information.

In a possible implementation manner, after the obtaining an operation location of the first operation on the map object, the method further includes:

determining a mapping operation location, on the master map, of the operation location on the map object based on a mapping relationship between the map object and the master map.

The first synchronization instruction is further generated by using the mapping operation location, and the first synchronization instruction is further used for displaying, at the mapping operation location on the master map, a special effect icon corresponding to the identifier of the first special effect icon.

In a possible implementation manner, the first operation is a first pressing operation whose duration exceeds a first time threshold.

The obtaining an operation location of the first operation on the map object includes:

obtaining a pressing location of the first pressing operation on the map object.

In a possible implementation manner, the signal list is a signal wheel, the signal wheel includes several set regions, and each region corresponds to one piece of prompt information.

The obtaining, based on target prompt information selected by the user from the signal list, an identifier corresponding to the target prompt information includes:

determining an end location of the first pressing operation and a target region in which the end location is located in the signal wheel; and obtaining, based on target prompt information corresponding to the target region, an identifier of a first special effect icon corresponding to the target prompt information.

In a possible implementation manner, the service scenario further includes an original map object, the map object is a display effect image obtained after the original map object is amplified, and there is a mapping relationship between every two of the original map object, the map object, and the master map.

Before the generating a first synchronization instruction by using at least the identifier corresponding to the target prompt information, and sending the first synchronization instruction to each client needing to perform exchange, the method further includes:

determining an original mapping operation location, on the original map object, of the operation location on the map object based on the mapping relationship between the original map object and the map object.

The first synchronization instruction is further generated by using the original mapping operation location, and the first synchronization instruction is further used for instructing the client to display, at the original mapping operation location on the original map object, a special effect icon corresponding to the identifier of the first special effect icon.

In a possible implementation manner, the target prompt information is used for instructing to gather together towards the operation location on the map object.

The first special effect icon corresponding to the target prompt information includes a direction indication icon, and the direction indication icon is used for indicating a direction, relative to the operation location, of a location of a character model controlled by the client in the service scenario.

In a possible implementation manner, the method further includes:

obtaining an operation object of a second operation when detecting that the user performs the second operation on the map object in the service scenario;

obtaining, based on an object type of the operation object, prompt information corresponding to the object type;

obtaining an identifier of an avatar icon of a character model controlled by the user in the service scenario and an identifier of an avatar icon of the operation object; and generating a second synchronization instruction by using at least the identifier of the avatar icon of the character model, the identifier of the avatar icon of the operation object, and the prompt information, and sending the second synchronization instruction to each client needing to perform exchange, the second synchronization instruction being used for instructing the client to display the avatar icon of the character model, the avatar icon of the operation object, and the prompt information.

In a possible implementation manner, the method further includes:

obtaining the location, on the map object, of the character model controlled by the user; and The generating a second synchronization instruction by using at least the identifier of the avatar icon of the character model, the identifier of the avatar icon of the operation object, and the prompt information, and sending the second synchronization instruction to each client needing to perform exchange includes:

generating the second synchronization instruction by using the identifier of the avatar icon of the character model, the identifier of the avatar icon of the operation object, the prompt information, the location of the character model controlled by the user, and a preset identifier of a second special effect icon, and sending the second synchronization instruction to each client needing to perform exchange, the second synchronization instruction being specifically used for instructing the client to display, at the location of the character model controlled by the user, a special effect icon corresponding to the identifier of the second special effect icon.

In a possible implementation manner, the service scenario further includes an original map object, the map object is a display effect image obtained after the original map object is amplified, and there is a mapping relationship between every two of the original map object, the map object, and the master map.

The generating the second synchronization instruction by using the identifier of the avatar icon of the character model, the identifier of the avatar icon of the operation object, the prompt information, the location of the character model controlled by the user, and a preset identifier of a second special effect icon, and sending the second synchronization instruction to each client needing to perform exchange includes:

determining, based on the mapping relationship between the original map object and the map object, an original mapping character model location on the original map object that is of the location of the character model controlled by the user; and generating the second synchronization instruction by using the identifier of the avatar icon of the character model, the identifier of the avatar icon of the operation object, the prompt information, the original mapping character model location, and the preset identifier of the second special effect icon, and sending the second synchronization instruction to each client needing to perform exchange, the second synchronization instruction being further used for instructing the client to display, at the original mapping character model location, the special effect icon corresponding to the identifier of the second special effect icon.

In a possible implementation manner, the second operation is a second pressing operation whose duration does not exceed the first time threshold.

The obtaining an operation object of a second operation includes:

obtaining an operation object of the second pressing operation.

In a possible implementation manner, the method further includes:

presenting several preset shortcut messages in response to a trigger operation performed by the user on a shortcut message icon presented on an interface of the target client;

determining a target shortcut message selected by the user from the several preset shortcut messages;

obtaining the identifier of the avatar icon of the character model controlled by the user in the service scenario; and generating a third synchronization instruction by using at least the identifier of the avatar icon of the character model and the target shortcut message, and sending the third synchronization instruction to each client needing to perform exchange, the third synchronization instruction being used for instructing the client to display the avatar icon of the character model and the target shortcut message.

In a possible implementation manner, the method further includes:

obtaining the location, on the map object, of the character model controlled by the user.

The generating a third synchronization instruction by using at least the identifier of the avatar icon of the character model and the target shortcut message, and sending the third synchronization instruction to each client needing to perform exchange includes:

generating the third synchronization instruction by using the identifier of the avatar icon of the character model, the target shortcut message, the location of the character model on the map object, and a preset identifier of a third special effect icon, and sending the third synchronization instruction to each client needing to perform exchange, the third synchronization instruction being further used for instructing the client to display, at the location of the character model, a special effect icon corresponding to the identifier of the third special effect icon.

An embodiment of this application further provides a storage medium, configured to store program code, the program code being used for performing any implementation in the method for exchanging information in an application service according to the foregoing embodiments.

An embodiment of this application further provides a computer program product including instructions, the computer program product, when running on a computer, causing the computer to perform any implementation in the method for exchanging information in an application service according to the foregoing embodiments.

Finally, it should be noted that the relational terms herein such as first and second are used only to differentiate an entity or operation from another entity or operation, and do not require or imply any actual relationship or sequence between these entities or operations. In addition, the terms "include", "contain", or any other variants means to cover the non-exclusive inclusion, for example, a process, method, product, or device that includes a list of elements is not necessarily limited to those elements, but may include other elements not expressly listed or inherent to such a process, method, product, or device. Without other limitation, elements restricted by a statement "including one . . . " does not exclude that additional same elements exist in addition to a process, method, product, or device including the elements.

It should be noted that the embodiments in this specification are all described in a progressive manner. Description of each of the embodiments focuses on differences from other embodiments, and reference may be made to each other for the same or similar parts among respective embodiments.

The above description of the disclosed embodiments enables persons skilled in the art to implement or use this application. Various modifications to these embodiments are obvious to persons skilled in the art, the general principles defined in the present disclosure may be implemented in other embodiments without departing from the spirit and scope of this application. Therefore, this application is not limited to these embodiments illustrated in the present disclosure, but needs to conform to the broadest scope consistent with the principles and novel features disclosed in the present disclosure.

What is claimed is:

1. A method for exchanging information in an application service performed by a computing device in connection with a target client, the method comprising:
   detecting a first operation on a map object in a service scenario performed by a user;
   displaying a signal list corresponding to the first operation, the signal list comprising several pieces of preset prompt information, and the map object being a mapped image for a master map of the service scenario, wherein visible objects in the master map are presented on the map object;
   receiving target prompt information selected by the user from the signal list, the target prompt information being any one of the several pieces of prompt information;
   obtaining, based on the target prompt information, an identifier corresponding to the target prompt information;
   generating a first synchronization instruction by using at least the identifier corresponding to the target prompt information;
   sending the first synchronization instruction to each of a plurality of clients needing to perform exchange, the first synchronization instruction causes each of the plurality of clients to display the target prompt information selected by the user from the signal list;
   presenting several preset shortcut messages in response to a trigger operation performed by the user on a shortcut message icon presented on an interface of the target client;
   determining a target shortcut message selected by the user from the several preset shortcut messages;
   obtaining the identifier of the avatar icon of the character model controlled by the user in the service scenario;
   generating a third synchronization instruction by using at least the identifier of the avatar icon of the character model and the target shortcut message, and sending the third synchronization instruction to each client needing to perform exchange, the third synchronization instruction being used for instructing the client to display the avatar icon of the character model and the target shortcut message in text form and broadcast the target shortcut message in speech form simultaneously.

2. The method according to claim 1, further comprising:
   before displaying the signal list corresponding to the first operation:
      obtaining an operation location of the first operation on the map object; and
   wherein the displaying a signal list corresponding to the first operation comprises:
      displaying, at the operation location, the signal list corresponding to the first operation.

3. The method according to claim 2, wherein the first synchronization instruction is further generated by using the operation location, and the first synchronization instruction is specifically used for instructing the client to display the target prompt information at the operation location on the map object.

4. The method according to claim 3, wherein the identifier corresponding to the target prompt information is an identifier of a first special effect icon corresponding to the target prompt information; and
   the displaying, by the client, the target prompt information at the operation location on the map object further comprises: displaying, by the client at the operation location by using the identifier of the first special effect icon corresponding to the target prompt information, the first special effect icon corresponding to the target prompt information.

5. The method according to claim 4, further comprising:
   after obtaining the operation location of the first operation on the map object:
      determining, on the master map, a mapping operation location of the operation location on the map object based on a mapping relationship between the map object and the master map; and
   wherein the first synchronization instruction is further generated by using the mapping operation location, and the first synchronization instruction is further used for displaying, at the mapping operation location on the master map, a special effect icon corresponding to the identifier of the first special effect icon.

6. The method according to claim 5, wherein the first operation is a first pressing operation whose duration exceeds a first time threshold; and
   the obtaining an operation location of the first operation on the map object further comprises:
      obtaining a pressing location of the first pressing operation on the map object.

7. The method according to claim 6, wherein the signal list is a signal wheel, the signal wheel comprises several set regions, and each region corresponds to one piece of prompt information; and
   the obtaining, based on target prompt information selected by the user from the signal list, an identifier corresponding to the target prompt information further comprises:
      determining an end location of the first pressing operation and a target region in which the end location is located in the signal wheel; and
      obtaining, based on target prompt information corresponding to the target region, an identifier of a first special effect icon corresponding to the target prompt information.

8. The method according to claim 4, wherein the service scenario further comprises an original map object, the map object is a display effect image obtained after the original map object is amplified, and there is a mapping relationship between every two of the original map object, the map object, and the master map;
   before the generating a first synchronization instruction by using at least the identifier corresponding to the target prompt information, and sending the first synchronization instruction to each client needing to perform exchange, the method further comprises:
      determining an original mapping operation location, on the original map object, of the operation location on the map object based on the mapping relationship between the original map object and the map object; and the first synchronization instruction is further generated by using the original mapping operation location, and the first synchronization instruction is further used for instructing the client to display, at the original mapping operation location on the original map object, a special effect icon corresponding to the identifier of the first special effect icon.

9. The method according to claim 2, wherein the target prompt information is used for instructing to gather together towards the operation location on the map object; and the first special effect icon corresponding to the target prompt information comprises a direction indication icon, and the direction indication icon is used for indicating a direction, relative to the operation location, of a location of a character model controlled by the client in the service scenario.

10. The method according to claim 1, further comprising:

obtaining an operation object of a second operation when detecting that the user performs the second operation on the map object in the service scenario;

obtaining, based on an object type of the operation object, prompt information corresponding to the object type;

obtaining an identifier of an avatar icon of a character model controlled by the user in the service scenario and an identifier of an avatar icon of the operation object; and generating a second synchronization instruction by using at least the identifier of the avatar icon of the character model, the identifier of the avatar icon of the operation object, and the prompt information, and sending the second synchronization instruction to each client needing to perform exchange, the second synchronization instruction being used for instructing the client to display the avatar icon of the character model, the avatar icon of the operation object, and the prompt information.

11. The method according to claim 10, further comprising:

obtaining a location, on the map object, of the character model controlled by the user; and wherein the generating a second synchronization instruction by using at least the identifier of the avatar icon of the character model, the identifier of the avatar icon of the operation object, and the prompt information, and sending the second synchronization instruction to each client needing to perform exchange further comprises:

generating the second synchronization instruction by using the identifier of the avatar icon of the character model, the identifier of the avatar icon of the operation object, the prompt information, the location of the character model controlled by the user, and a preset identifier of a second special effect icon, and sending the second synchronization instruction to each client needing to perform exchange, the second synchronization instruction being specifically used for instructing the client to display, at the location of the character model controlled by the user, a special effect icon corresponding to the identifier of the second special effect icon.

12. The method according to claim 11, wherein the service scenario further comprises an original map object, the map object is a display effect image obtained after the original map object is amplified, and there is a mapping relationship between every two of the original map object, the map object, and the master map; and the generating the second synchronization instruction by using the identifier of the avatar icon of the character model, the identifier of the avatar icon of the operation object, the prompt information, the location of the character model controlled by the user, and a preset identifier of a second special effect icon, and sending the second synchronization instruction to each client needing to perform exchange further comprises:

determining, based on the mapping relationship between the original map object and the map object, an original mapping character model location on the original map object that is of the location of the character model controlled by the user; and generating the second synchronization instruction by using the identifier of the avatar icon of the character model, the identifier of the avatar icon of the operation object, the prompt information, the original mapping character model location, and the preset identifier of the second special effect icon, and sending the second synchronization instruction to each client needing to perform exchange, the second synchronization instruction being further used for instructing the client to display, at the original mapping character model location, the special effect icon corresponding to the identifier of the second special effect icon.

13. The method according to claim 10, wherein the second operation is a second pressing operation whose duration does not exceed the first time threshold; and the obtaining an operation object of a second operation further comprises:

obtaining an operation object of the second pressing operation.

14. The method according to claim 1, further comprising:

obtaining the location, on the map object, of the character model controlled by the user; and the generating a third synchronization instruction by using at least the identifier of the avatar icon of the character model and the target shortcut message, and sending the third synchronization instruction to each client needing to perform exchange comprises:

generating the third synchronization instruction by using the identifier of the avatar icon of the character model, the target shortcut message, the location of the character model on the map object, and a preset identifier of a third special effect icon, and sending the third synchronization instruction to each client needing to perform exchange, the third synchronization instruction being further used for instructing the client to display, at the location of the character model, a special effect icon corresponding to the identifier of the third special effect icon.

15. A computing device for exchanging information in an application service in connection with a target client, comprising:

one or more processors;

memory; and a plurality of programs stored in the memory that, when executed by the one or more processors, cause the computing device to perform a plurality of operations including:

detecting a first operation on a map object in a service scenario performed by a user;

displaying a signal list corresponding to the first operation, the signal list comprising several pieces of set prompt information, and the map object being a mapped image for a master map of the service scenario, wherein visible objects in the master map are presented on the map object;

receiving target prompt information selected by the user from the signal list, the target prompt information being any one of the several pieces of prompt information;

obtaining, based on the target prompt information, an identifier corresponding to the target prompt information;

generating a first synchronization instruction by using at least the identifier corresponding to the target prompt information;

sending the first synchronization instruction to each of a plurality of clients needing to perform exchange, the first synchronization instruction causes each of the plurality of clients to display the target prompt information selected by the user from the signal list, presenting several preset shortcut messages in response to a trigger operation performed by the user on a shortcut message icon presented on an interface of the target client;

determining a target shortcut message selected by the user from the several preset shortcut messages;

obtaining the identifier of the avatar icon of the character model controlled by the user in the service scenario; and generating a third synchronization instruction by using at least the identifier of the avatar icon of the character model and the target shortcut message, and sending the third synchronization instruction to each client needing to perform exchange, the third synchronization instruction being used for instructing the client to display the avatar icon of the character model and the target shortcut message in text form and broadcast the target shortcut message in speech form simultaneously.

16. The computing device according to claim 15, wherein the plurality of operations include:
before displaying the signal list corresponding to the first operation:
obtaining an operation location of the first operation on the map object; and
wherein the displaying a signal list corresponding to the first operation comprises:
displaying, at the operation location, the signal list corresponding to the first operation.

17. The computing device according to claim 15, wherein the plurality of operations include:
obtaining an operation object of a second operation when detecting that the user performs the second operation on the map object in the service scenario;
obtaining, based on an object type of the operation object, prompt information corresponding to the object type;
obtaining an identifier of an avatar icon of a character model controlled by the user in the service scenario and an identifier of an avatar icon of the operation object; and
generating a second synchronization instruction by using at least the identifier of the avatar icon of the character model, the identifier of the avatar icon of the operation object, and the prompt information, and sending the second synchronization instruction to each client needing to perform exchange,
the second synchronization instruction being used for instructing the client to display the avatar icon of the character model, the avatar icon of the operation object, and the prompt information.

18. A non-transitory computer readable storage medium storing a plurality of instructions in connection with a computing device having one or more processors for exchanging information in an application service in connection with a target client, wherein the plurality of instructions, when executed by the one or more processors, cause the computing device to perform a plurality of operations including:
detecting a first operation on a map object in a service scenario performed by a user;
displaying a signal list corresponding to the first operation, the signal list comprising several pieces of set prompt information, and the map object being a mapped image for a master map of the service scenario, wherein visible objects in the master map are presented on the map object;
receiving target prompt information selected by the user from the signal list, the target prompt information being any one of the several pieces of prompt information;
obtaining, based on the target prompt information, an identifier corresponding to the target prompt information;
generating a first synchronization instruction by using at least the identifier corresponding to the target prompt information; and
sending the first synchronization instruction to each of a plurality of clients needing to perform exchange, the first synchronization instruction causes each of the plurality of clients to display the target prompt information selected by the user from the signal list;
presenting several preset shortcut messages in response to a trigger operation performed by the user on a shortcut message icon presented on an interface of the target client;
determining a target shortcut message selected by the user from the several preset shortcut messages;
obtaining the identifier of the avatar icon of the character model controlled by the user in the service scenario; and
generating a third synchronization instruction by using at least the identifier of the avatar icon of the character model and the target shortcut message, and sending the third synchronization instruction to each client needing to perform exchange, the third synchronization instruction being used for instructing the client to display the avatar icon of the character model and the target shortcut message in text form and broadcast the target shortcut message in speech form simultaneously.

* * * * *